United States Patent [19]
Fiala et al.

[11] Patent Number: 5,930,396
[45] Date of Patent: Jul. 27, 1999

[54] METHOD AND APPARATUS FOR GENERATING HALFTONE OUTPUT

[75] Inventors: Edward Reid Fiala, Sunnyvale; Raymond Wai-Keung Wong, San Jose, both of Calif.

[73] Assignee: Adobe Systems Incorporated, San Jose, Calif.

[21] Appl. No.: 08/841,528

[22] Filed: Apr. 22, 1997

[51] Int. Cl.$^6$ .................................................. H04N 1/405
[52] U.S. Cl. .......................... 382/237; 382/270; 358/456; 358/457
[58] Field of Search .................................. 382/237, 270; 358/456, 457, 466, 458, 298; 395/109

[56] References Cited

U.S. PATENT DOCUMENTS

| | | | |
|---|---|---|---|
| 5,216,753 | 6/1993 | Ng ............................................. | 395/109 |
| 5,235,435 | 8/1993 | Schiller .................................... | 358/456 |
| 5,285,291 | 2/1994 | Schiller .................................... | 358/453 |
| 5,291,311 | 3/1994 | Miller ....................................... | 358/456 |
| 5,305,118 | 4/1994 | Schiller et al. .......................... | 358/456 |
| 5,581,372 | 12/1996 | Kerz ........................................ | 358/456 |
| 5,602,976 | 2/1997 | Cooper et al. ........................... | 395/116 |

OTHER PUBLICATIONS

Robert Geist, "A Markovian Framework for Digital Halftoning," ACM Transactions of Graphics, vol. 12, Apr., 1993, pp. 136–157.

Mitsa et al., "Digital Halftoning Using a Blue Noise Mask," Optical Society of America, vol.9, No.11, Nov. 1992, pp. 1920–1929.

Mitsa et al., "The Construction and Evaluation of Halftone Patterns with Manipulated Power Spectra," conference proceeding for Raster Imaging and Digital Typography 1992, pp. 90–96.

F.I.Van Nes et al., "Spatial Modulation Transfer in the Human Eye," Journal of the Optical Society of America, vol.57, No.3, pp. 401–406.

R.Ulichney, "Digital Halftoning," The MIT Press, Cambridge, Massachusetts, London, England, pp. 1–39, 239–243.

*Primary Examiner*—Scott Rogers
*Attorney, Agent, or Firm*—Fish & Richardson, P.C.

[57] ABSTRACT

A method of generating halftone output on an output device. The method includes retrieving at least one table which associates gray levels with halftone results for a region of an output frame including more than one pixel, determining a reference gray level for a tile of an output frame including more than one pixel, using the at least one table to determine a halftone result for the reference gray level, storing the halftone result for the reference gray level to the tile of the output frame, and delivering the output frame to the output device. The table may be generated from a set of thresholds, which may be a threshold array. A first table may associates gray levels with codes and a second table may associates codes with halftone results, and the method may include converting the reference gray level to a reference code with the first table and converting the reference code to the halftone result for the reference gray level with the second table. Converting the reference gray level to a code may occur during a front-end interpretation and converting the reference code to the halftone result may occur during a back-end rendering.

15 Claims, 9 Drawing Sheets

| Grey Level | Bit Pattern |
|---|---|
| 0 | 000 000 000 000 |
| ⋮ | ⋮ |
| 10 | 000 010 000 000 |
| ⋮ | ⋮ |
| 100 | 011 011 011 000 |
| ⋮ | ⋮ |
| 255 | 111 111 111 111 |

270a

| Grey Level | Bit Pattern |
|---|---|
| 0 | 000 000 000 000 |
| ⋮ | ⋮ |
| 10 | 000 000 000 000 |
| ⋮ | ⋮ |
| 100 | 001 001 001 000 |
| ⋮ | ⋮ |
| 255 | 111 111 111 111 |

270b

| Grey Level | Bit Pattern |
|---|---|
| 0 | 000 000 000 000 |
| ⋮ | ⋮ |
| 10 | 000 000 000 000 |
| ⋮ | ⋮ |
| 100 | 100 100 100 000 |
| ⋮ | ⋮ |
| 255 | 111 111 111 111 |

270c

| Grey Level (274) | Bit Pattern (276) |
|---|---|
| 0 | 000 000 000 000 |
| ⋮ | ⋮ |
| 10 | 000 100 000 000 |
| ⋮ | ⋮ |
| 100 | 110 110 110 000 |
| ⋮ | ⋮ |
| 255 | 111 111 111 111 |

| Grey Level | Code |
|---|---|
| 0 | 0 |
| 1 | 0 |
| 2 | 0 |
| ⋮ | ⋮ |
| 10 | 1 |
| ⋮ | ⋮ |
| 100 | 6 |
| ⋮ | ⋮ |
| 255 | 12 |

— 370

| Grey Level | Code |
|---|---|
| 0 | 0 |
| 1 | 0 |
| 2 | 0 |
| ⋮ | ⋮ |
| 10 | 1 |
| ⋮ | ⋮ |
| 100 | 3 |
| ⋮ | ⋮ |
| 255 | 12 |

— 370

| Grey Level | Code |
|---|---|
| 0 | 0 |
| 1 | 0 |
| 2 | 0 |
| ⋮ | ⋮ |
| 10 | 0 |
| ⋮ | ⋮ |
| 100 | 3 |
| ⋮ | ⋮ |
| 255 | 12 |

— 370

| Grey Level (374) | Code (376) |
|---|---|
| 0 | 0 |
| 1 | 0 |
| 2 | 0 |
| ⋮ | ⋮ |
| 10 | 1 |
| ⋮ | ⋮ |
| 100 | 6 |
| ⋮ | ⋮ |
| 255 | 12 |

| Code | Bit Pattern |
|---|---|
| 0 | 000 000 000 000 |
| 1 | 000 010 000 000 |
| 2 | 000 011 000 000 |
| ⋮ | ⋮ |
| 12 | 111 111 111 111 |

— 380

| Code | Bit Pattern |
|---|---|
| 0 | 000 000 000 000 |
| 1 | 000 001 000 000 |
| 2 | 000 001 001 000 |
| ⋮ | ⋮ |
| 12 | 111 111 111 111 |

— 380

| Code | Bit Pattern |
|---|---|
| 0 | 000 000 000 000 |
| 1 | 000 100 000 000 |
| 2 | 000 100 100 000 |
| ⋮ | ⋮ |
| 12 | 111 111 111 111 |

— 380

| Code (384) | Bit Pattern (386) |
|---|---|
| 0 | 000 000 000 000 |
| 1 | 000 100 000 000 |
| 2 | 000 110 000 000 |
| ⋮ | ⋮ |
| 12 | 111 111 111 111 |

— 380, 382

METHOD AND APPARATUS FOR GENERATING HALFTONE OUTPUT

FIELD OF THE INVENTION

The present invention relates to methods and apparatus directed to a method for producing halftone images or other kinds of halftone output on a variety of digital display, typesetting, or printing devices.

BACKGROUND

Presently, digital halftoning is performed by general purpose digital computers or by special purpose digital hardware. Digital halftoning is used, for example, in typesetting devices to prepare plates for printing presses, in xerographic and inkjet desk top printers, in computer CRT displays, and in other imaging devices. Some terms relevant to digital halftoning will be defined as follows:

output device—The printer, image setter, display, or other device on which halftone output is produced.

picture element—The small, colored or monochrome dot which is the atomic unit of visual output of the output device.

output frame—The digital representation of the collection of pixels which the output device images onto the display or onto an output medium such as paper or film. The output frame is not necessarily paginated (i.e., it could be a paper scroll or an internal digital representation of some sort).

pixel—The digital representation of the picture element.

memory—The storage in a computer or other digital device, such as RAM, ROM, disk, or other kinds of volatile or non-volatile storage.

frame buffer—A buffer of memory which holds an output frame.

deliver frame—The process by which the output frame is sent to the output device.

image—A set of digital values representing a picture. The digital values will be called 'samples' to distinguish them from the 'pixels' in an output frame. Each sample identifies the color or gray scale for a small area of the image. The samples are usually in a raster (though other arrangements such as the Peano scan are possible).

raster—The arrangement of the pixels in an output frame or the samples in an image into a rectangular array of scan lines.

The range of colors for each picture element is often limited by the output device technology to a number of levels far smaller than the range of the human visual system. On many laser printers, ink jet printers, and type setters, for example, a picture element can have only two colors, that of the toner, ink, or other colorant and that of the underlying paper or other surface. Furthermore, when colorant is produced in a picture element, its size is limited to a single size or to a small number of sizes. In the examples that follow, it will be assumed for definiteness that the colorant is black, and that the underlying surface is white. Therefore, the intermediate colors will be labeled 'grays'. The principles described apply to other color combinations.

When picture elements are small, the visual effect of gray can be achieved by controlling the size, number, thickness, and/or transparency (to name several of the possible mechanisms) of the picture elements. If the pattern of picture elements is fine enough, the human viewer will perceive a uniform gray rather than a pattern of individual dots. The shade of gray may be controlled by selecting the percentage of black and white in the dot pattern. The simulation of various shades of gray by aggregating a number of colored dots is called halftoning.

For a bi-valued output device, such as most laser and inkjet printers, the color perceived by a person viewing the output is determined by the fraction of the picture elements in which the colorant is produced. Multi-valued output devices can produce picture elements of different sizes, thicknesses, densities, or transparencies. For these devices, the perceived color is determined by the number of picture elements which have colorant and by the amount of colorant produced in each picture element. However, unless the amount of colorant in each individual picture element can be controlled sufficiently finely to approximate, within the limits of the output device, the full color range of a human viewer, halftoning techniques are still needed to achieve the appearance of intermediate colors. An advantage of a multi-valued output device is that it can achieve the desired gradations of grays in a smaller spatial area than a bi-valued output device.

In addition, some output devices can use two or more different colorants. For example, if one colorant is black and another is gray, then light grays can be produced by halftoning between the background white and the gray colorant, and dark colors can be produced by halftoning between the gray and black colorants.

Halftoning techniques can also be applied on an output device with two or more colorants to produce multi-colored or multi-toned output. Most issues for multi-colored output devices can be explained for a monochrome, bi-valued output device. Some additional issues, such as Moire patterns, must be managed with additional considerations for multi-colored output, but the halftoning techniques used for multi-colored output are essentially identical to those for monochrome output devices. The techniques for halftoning in monochrome devices discussed herein may be extended to multi-valued picture elements, to multi-toned colorants, to multi-colored output devices, and to other kinds of output devices according to practices known in the art.

In a high-level description of how the picture should look, three kinds of content that often occur are graphics (e.g., fills and strokes), glyphs (e.g., text), and images. To convert the high-level description of a graphic or glyph into pixels in the output frame, a mathematical outline (or closed curve) and a gray level are determined for the graphic or glyph. Then the halftone pattern corresponding to the gray level is copied into the pixels which fall within the outline. To convert an image into pixels in the output frame, the sample set of the image is clipped in such a way that a reference image sample value, or 'reference gray level', can be associated with each pixel in the output frame. The final step in this process is to apply a halftoning technique to determine the value of each pixel as a function of its reference gray level and its position in the output frame.

There are a variety of techniques to select a reference gray level for the halftoning process. When a pixel occupies an area in the output frame which has more than one image sample over it, it is usually faster to choose one of these overlying image samples as the reference gray level. This technique is called 'point sampling'. Another technique that is often visually superior is to blend or average the different overlying image samples. Two examples of this alternative technique are 'linear interpolation' and 'bi-cubic interpolation'. A variety of other techniques to determine a reference gray level are known in the art.

If different objects in an output frame are positioned next to each other, the visual result will often be superior if a uniform halftoning method is used in all of the objects. Otherwise, the differences in the halftoning process may generate visible defects at the boundaries between the objects. To avoid these defects, particularly if the touching objects are both images or are both graphic objects, the same halftoning method may be used for any object which might be placed at a particular position of the output frame. Some experts choose to differentiate the halftoning method used for images from the halftoning method used for graphic objects because the objectives may be different. For example, the most important objective for an image may be accurate representation of the gray level, whereas the most important objective for a graphic object might be sharply delineating edges.

One digital halftoning technique is threshold halftoning. In threshold halftoning, a reference gray level from an image is determined at each pixel of the output frame. The reference gray level is compared to a reference threshold for that pixel, and a value is assigned to the pixel according to the results of the comparison. The thresholds for the pixel are usually specified by either a spot function or a threshold array, although other means of specification are also possible. With a spot function, the threshold may be specified as a mathematical function of the device position. With a threshold array, the threshold is obtained from an array. A threshold array typically represents a rectangular shape, but a parallelogram or other shape can also be used. In principle, the threshold array can be as large as the output frame itself. However, in most output devices the cost of the memory to hold such a large array would be prohibitive. Therefore, a smaller array is usually treated as a 'tile' and is replicated to cover the output frame so that each pixel corresponds to one element of the threshold array.

Although there are different techniques to specify thresholds, for the purpose of definiteness the discussion herein assumes a threshold array is used to determine the thresholds. The following is an example of a threshold array:

```
108 044 036 100 140 172 204 156
052 004 012 092 220 252 244 188
060 020 028 084 180 228 236 212
116 068 076 124 148 196 164 132
144 176 208 160 112 048 040 104
224 255 248 192 056 008 016 096
184 232 240 216 064 024 032 088
152 200 168 136 120 072 080 128
```

In this example threshold array, the rows of numbers correspond to a sequence of pixels in the X-direction of the two-dimensional raster, and the columns of numbers correspond to a sequence of scan lines in the Y-direction of the raster. The threshold array is replicated horizontally and vertically to fill the entire output frame. This example threshold array is capable of achieving 65 different halftone patterns or gray levels. In an area uniformly shaded with a reference gray level of 128, this threshold array creates a checkerboard pattern of 4×4 pixel black and white rectangles. The black or white rectangles in the pattern may be called 'halftone dots'. As the reference gray level decreases from 128 to 0, the black checkers shrink and disappear. Similarly as the gray level increases from 128 to 255, the white checkers shrink to white dots. When applied to an image with a uniform reference gray level, this threshold array creates a spatially uniform dot pattern in which the size of the dots varies according to the reference gray level. If this dot pattern is sufficiently fine (i.e., if it has a high spatial resolution), then a human viewer will see the desired gray instead of the dot pattern. For a device raster of 600 pixels/inch×600 scan lines/inch, the halftone dot pattern will be a grid with dot centers separated by $\frac{1}{75}$th of an inch horizontally and vertically or by $\frac{1}{106}$th of an inch diagonally.

A uniform array of halftone dots has both advantages and disadvantages in comparison to a more jumbled array. One advantage is that the threshold array is small. Another advantage, is that some lossless data compression of the halftone result may be possible in some situations. One disadvantage of a uniform array is that it is more vulnerable to visible pattern defects (often called Moire patterns) and other patterns which might form as a result of 'beating' of the lines of halftone dots against features within the image content. For example, in the example threshold array, the two diagonal black or white dots may differ by one pixel. A human viewer may perceive an undesirable pattern due this difference.

With a large threshold array, it is possible to create the appearance of a random, jumbled set of halftone dots in which the human viewer detects few or no repeated patterns. An example of this technique is Adobe Brilliant Screens (as described in U.S. Pat. No. 5,590,223). The threshold array is typically a square that is 64 to 2048 pixels on a side. Within the threshold array, many halftone dots of different sizes and irregular placement are formed, creating a jumbled pattern in which combinations of halftone dots do not appear to the human viewer to aggregate into patterns. A jumbled array greatly reduces Moire patterns. However, if a large area of uniform gray is displayed, the human viewer may perceive the repetition of a small tile pattern as a degradation. Therefore the threshold array must be large in order to spatially separate the tile boundaries so that the human viewer does not perceive the pattern. One disadvantage of a large threshold array is the correspondingly large amount of memory required to store it. Another disadvantage, as compared to a uniform array, is that the halftone result is less compressible with lossless data compression.

Threshold array and spot function techniques are members of a broader class of halftoning techniques in which the value of each pixel in the output frame is selected according to a reference gray level of the image over that position. The broad class of techniques may be described by the following functions:

reference gray level=function1(pixel position, image samples over or near pixel position)

pixel value=function2(pixel position, reference gray level).

With a traditional threshold array, the same threshold is used at a particular device position regardless of the image reference gray level at that position. Therefore, for a threshold array the second functional dependence may be specialized to:

pixel value=function3(reference gray level function4 (pixel position))

A variation is to choose the threshold array according to the reference gray level; this results in the threshold at each position being a function of both the reference gray level and the position. In this variation, there could be a different threshold at every device position for every gray level. For example, different dot patterns may be used for very light and very dark regions of halftone output. However, this technique is slower and requires more memory than the traditional technique.

Although fine dot patterns may look best under ideal conditions, a consideration in designing a threshold array is that grainier halftone dot patterns sometimes give more consistent appearance across changes in temperature, humidity, toner or ink level, and other factors. In addition, grainier patterns may photocopy better. In sum, all of these techniques involve experimentation, judgment, and personal preference.

Various other digital halftoning techniques have been developed over the years. For example, error diffusion and FM screening, collectively referred to as stochastic halftoning, produce somewhat similar results. In these techniques, a semi-random process is used to create a pattern of very small seemingly randomly placed dots, while still closely controlling the average spacing of those dots and relative density of black and white. A summary of error diffusion and threshold array based halftoning can be found in the book "Digital Halftoning" by Robert Ulichney. A stochastic halftoning technique can also be found in "A Markovian Framework for Digital Halftoning" by Robert Geist et al. in the ACM Transactions of Graphics Volume 12 Number 2 (April 1993). This article explains halftoning based on random processes that generate results similar to error diffusion. Another stochastic halftoning technique is described in "Digital Halftoning Using a Blue Noise Mask" by Mista and Parker in The SPIE conference Proceedings, San Jose, 1991, and in a companion paper "The Construction and Evaluation of Halftone Patterns With Manipulated Power Spectra" by Mista, Ulichney and Parker, in the conference proceedings for Raster Imaging and Digital Typography in 1992. These papers describe a method of constructing dot profiles which are free of annoying patterns and which reproduce a desired gray level. Each of the above references is incorporated herein by reference.

A threshold array implementation of a stochastic halftoning method is possible if each pixel produced by the halftoning process depends only upon the reference gray level at its position in the output frame. Error diffusion is not implementable with a threshold array because it diffuses the gray level at one position into the determination of the reference gray level for nearby pixels. The halftoning techniques that are functionally equivalent to threshold halftoning are usually faster because they require less computation per pixel.

For some output devices, an advantage of threshold-array-equivalent halftoning is that it permits independent halftoning of different images which are adjacent to each other in an output frame. No seams are created at the boundaries between the objects because the pixel value at each pixel position depends only upon the image reference gray level at that spot and not upon diffusion values from adjoining pixels. Similarly, it may be advantageous in an output device to use the same set of thresholds for halftoning other content elements next to images such as strokes or fills.

Some output devices, such as laser printers, cannot stop and wait for halftoning processing to finish after starting to move paper. Other devices, such as inkjet printers or image setters, may develop a streak across the page if ink dries when they are stopped or if there is a slight mechanical irregularity when stopping and restarting. Consequently, if the halftoning process is slower than the output device, the fully-halftoned image must be constructed so that it may be presented to the device fast enough to avoid stopping the device. This construction requires extra time and extra memory. Even if a device can stop without creating a visual defect, the time lost waiting for the halftoning process to finish is a performance degradation.

For a non-stop device, all pixels of the output frame may be stored in a frame buffer. Only after all the pixels are stored does the device start to deliver the output frame (e.g., start paper motion on a printer). During delivery of the output frame, pixels are fetched from the frame buffer and fed to the output device. On a 1200 pixels/inch×1200 scan lines/inch×1 bit/pixel device with 8.5-inch×11-inch frame buffer, for example, the frame buffer size (assuming no white margins) is 16,830,000 bytes.

The term 'rendering' refers to the process of constructing all of the pixel values in the output frame. The total time to deliver the output frame is therefore the total time to fully render the image plus the total time to deliver the output frame to the output device.

It may be possible to divide the construction of the output frame into two parts, termed 'front-end interpretation' and 'back-end rendering', respectively. If back-end rendering can meet the real-time requirement of the output device, then delivery of the output frame can start as soon as front-end interpretation has finished, and back-end rendering can then occur during frame delivery. This is called 'race rendering' (or, for a laser printer, 'racing the laser'). In race rendering, total time to deliver the frame (e.g., to print the page) is the total time for front-end interpretation plus the time to deliver the output frame. An example of the race and non-race rendering is illustrated as follows:

|  | Non-Race | Race-Render |
| --- | --- | --- |
| processing | 3.5 sec. | 2.0 sec. (front-end) |
| frame delivery | 2.0 sec. | 2.0 sec. (overlapping) |
| processing |  | 1.5 sec. (back-end) |
| total time | 5.5 sec. | 4.0 sec. |

In this illustration, the total time to construct the page is 3.5 seconds in both cases. In the non-race example, the entire time is used for full halftone construction of the output frame. However, in the race-render example, 1.5 seconds of the back-end rendering is overlapped with frame delivery, which results in a faster overall time. Faster halftoning, by enabling overlap of computation with frame delivery, may enable a larger reduction in the total time to deliver a frame than that which results only from reduction of the halftoning time.

Unfortunately, back-end rendering in prior halftoning methods is too slow to meet the real-time requirements for most output devices, unless expensive hardware is used. For this reason, most devices using prior halftoning methods completely render an image before beginning to deliver the frame.

In addition to overlapping halftoning and frame delivery, it is advantageous to overlap the construction of the current frame with the frame delivery of the preceding frame, if possible. For example, if delivery of an output frame does not require all of the output device's computational power and memory, then the excess time and memory can be used to start construction of the current output frame.

Devices employing non-race halftoning also require memory for either the fully-halftoned representation of the image itself or the full output frame. However, if images are race-rendered, an output device does not require memory for the fully-halftoned representation of the image. Instead, the output device requires memory for the representation of the image from which back-end rendering starts and several buffers that are much smaller than the full frame. During the race, the fully-halftoned pixels for one region are put in a buffer. The device then delivers the pixels in the buffer to the output device as they are needed. Afterwards, the buffer may be reused on another region. This process continues using several buffers in rotation to construct and deliver the output frame.

In some cases, the image will be much smaller than the fully-halftoned representation, and back-end rendering may be fast enough to start with it. For example, a 2,000×1,500 pixel×8 bits/pixel monochrome image requires 3,000,000 bytes of memory (RAM). On a 1,200 pixels/inch×1,200 scan lines/inch×8.5 inch×11 inch 1 bit/pixel output device (e.g., a 1,200 dots/inch Letter page laser printer), the full frame would be 16,830,000 bytes. In this example, the image itself is much smaller than the output frame and race-render reduces the memory required.

In other cases, the image will be much larger than the output frame. In this case, the image may be resampled during front-end interpretation to reduce the memory requirement. In the resampled image, only those samples needed during back-end rendering are retained. The representation of the image after both resampling and front-end interpretation could be either larger or smaller than the fully-halftoned image. If the resampled representation is smaller, then race rendering reduces the memory requirement.

Some devices employing halftoning compress either the fully-halftoned representation of the image or the full output frame (see, for example, U.S. Pat. No. 5,602,976, incorporated herein by reference). State of the art lossless compression methods (e.g., the CCITT group 4 method used with facsimile devices, the JBIG method, and the Lempel Ziv Welch (LZW) method) do not compress fully-halftoned frame data particularly well, though they achieve substantial compression on text and line art. Although the CCITT group 4 method achieves satisfactory compression on text and line art, it typically expands halftone data rather than compressing it. The LZW method can achieve about 2.5-to-1 compression and the JBIG method can achieve about 4-to-1 compression if the halftoning method creates uniformly spaced halftoned dots. However, if the halftoning method creates irregularly spaced halftoned dots the JBIG method may not achieve even 2-to-1 compression. Lossy methods can effectively compress the fully-halftoned representation, but their modifications reduce the quality of the image. Since not much lossless compression is possible on the fully-halftoned representation of an image, devices applying compression to conventional halftoning are likely to have a high memory requirement or to use lossy compression. When compression is used, the time for compression typically increases the time to deliver a frame. The decompression might also add to the time to deliver the frame, or it might be overlapped with frame delivery.

Some devices construct the fully-halftoned image representation on another device (e.g., a computer such as a personal computer (PC)) and communicate that representation either directly, or after applying data compression to it, to the output device. In this case, the output device itself does not need memory for the fully-halftone output frame, but the communication channel must transmit more data than would be required with a smaller representation. In addition, the device which constructs the fully-halftoned representation may be slower or require more memory than would be the case for race rendering. Furthermore, real-time requirements of the output device are imposed not only on back-end rendering but also on the communication channel. Compression may ease the real-time requirement imposed by the communication channel, but it increases the computation requirement on each end.

Because conventional halftoning is slow, race rendering of images with frame delivery and overlapping computation is impractical on many devices. Furthermore, if the fully-halftoned representation is constructed on a PC or workstation with plentiful memory, the total time to construct this representation, possibly compress the representation, transmit the representation or compressed representation over a communication channel to the output device, and expand the compressed representation, slows the rate at which the output device can deliver frames.

It is useful to describe conventional threshold halftoning for a bi-level output device. As illustrated in FIG. 1, a conventional halftoning method 10 begins by copying the image samples into memory (step 12). This step may include color conversions, clipping and other preprocessing that is not central to the halftoning process itself.

The method iterates over all pixels underneath the image, i.e., the area of the output frame into which the halftoned result is to be put (step 14). On each iteration, the reference gray level for the pixel is determined by a technique such as point sampling, linear interpolation, or bi-cubic interpolation (step 16). The threshold array element that corresponds to the pixel is fetched (step 17) and these two values are compared (step 18). If the image sample is less than the threshold, then the pixel is assigned a value of 0 (white), otherwise it is assigned a value of 1 (black) (step 19). For the next iteration, the pixel position is incremented and the image position corresponding to the new pixel position is computed (step 20).

When the image and the output frame are both rasters, one way to arrange the iteration is as an outer loop over scan lines in the output frame that are covered by the image, a middle loop over computer words in a scan line that are covered by the image, and an inner loop over pixels in a word. For a 32-bit word size, the inner loop then runs 32 times while filling a register with the black (1) or white (0) pixel results. On exiting from the inner loop, the middle loop copies this register into the output frame. This organization reduces the number of memory references during halftoning.

During step 12 the number of samples handled is the width multiplied by the height of the image. During steps 14–20, the number of iterations is equal to the area of the output frame underneath the image as measured in pixels. For high resolution output devices, the preponderance of the time is usually in steps 14–20.

SUMMARY OF THE INVENTION

In general, in one aspect, the invention provides a method of generating halftone output on an output device. The method includes retrieving at least one table which associates gray levels with halftone results for a region of an output frame including more than one pixel, determining a reference gray level for a tile of an output frame including more than one pixel, using the at least one table to determine a halftone result for the reference gray level, storing the halftone result for the reference gray level to the tile of the output frame, and delivering the output frame to the output device.

Embodiments of the invention may advantageously include one or more of the following features. The table is generated from a set of thresholds. The set of thresholds is a threshold array. The tile is rectangular, or a 2×2 pixel square, or a 4×4 pixel square. The at least one table includes a first table which associates gray levels with codes and a second table which associates codes with halftone results; and using the at least one table includes converting the reference gray level to a reference code with the first table and converting the reference code to the halftone result for the reference gray level with the second table. Converting the reference gray level to a code occurs during a front-end interpretation and converting the reference code to the halftone result occurs during a back-end rendering. The code represents the number of black pixels in the region. The method includes compressing the code or the reference gray level. The method includes race-halftoning in the output device.

In general, in another aspect, the invention provides a method of generating halftone output on an output device.

The method includes dividing an output frame into a plurality of tiles, each tile including more than one pixel; retrieving at least one table which associates gray levels with halftone results for a region of the output frame, the region including more than one pixel; for each tile, determining a reference gray level, using the at least one table to determine a halftone result for the reference gray level, and storing the halftone result for the reference gray level to the tile of the output frame; and delivering the output frame to the output device.

In general, in another aspect, the invention provides a method of generating halftone output on an output device. The method includes receiving an image; dividing an output frame into a plurality of tiles, each tile including more than one pixel; retrieving a first plurality of tables which associate gray levels with codes; retrieving a second plurality of tables which associate codes with halftone results for regions including more than one pixel; for each tile, selecting one table from the plurality of first tables and one table from the plurality of second tables based on the position of the tile in the output frame, determining a reference gray level based on the portion of the image corresponding to the position of the tile in the output frame, using the selected table from the first plurality of tables to convert the reference gray level to a code, using the selected table from the second plurality of tables to convert the code to a halftone result, and storing the halftone result to the tile of the output frame; and delivering the output frame to the output device.

The advantages of the invention include the following. Threshold halftoning is performed significantly faster. A small loss of quality associated with the halftoning method is imperceptible or nearly imperceptible. Devices employing the invention may be able to race render. The lower memory requirement of the image after front-end interpretation using the invention may permit more overlap of front-end interpretation with delivery of the preceding frame. Output devices may be constructed using less memory.

BRIEF DESCRIPTION OF THE DRAWINGS

FIG. 7A is an illustration of the tables created for the tiles of FIG. 6C according to the method of FIG. 5A.

FIGS. 7B and 7C are illustrations of the tables created according to the method of FIG. 5D.

DETAILED DESCRIPTION

Figure 1:
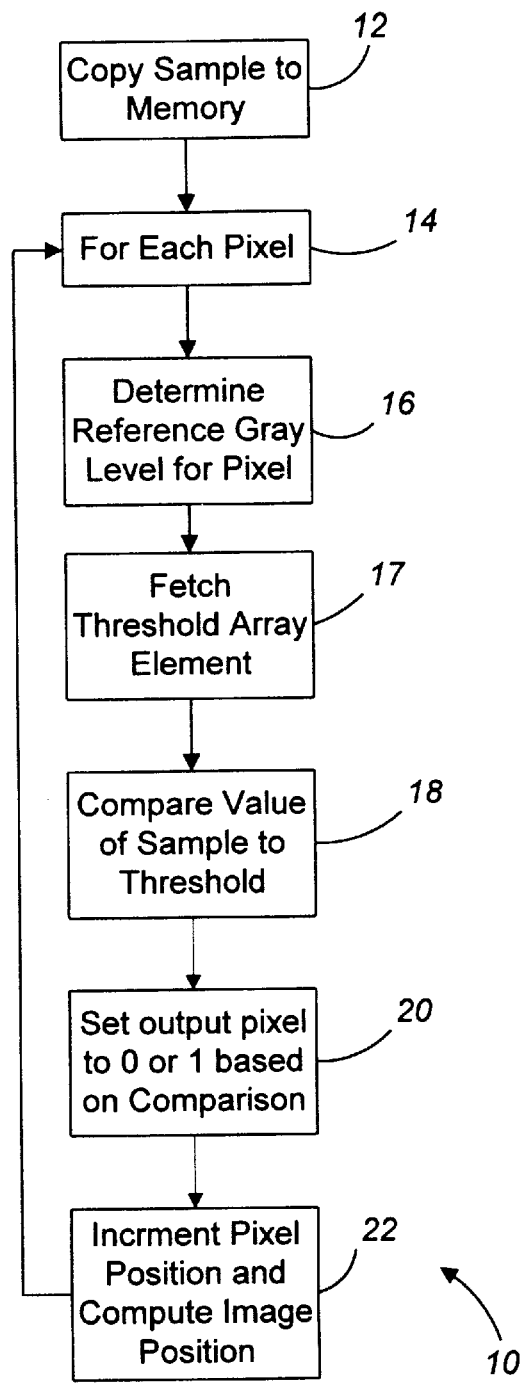
FIG. 1 is a flowchart of a conventional method of halftoning.

This invention exploits the spatial insensitivity of the human visual system at high frequencies. On modern printing devices, resolutions of 600 or 1200 pixels/inch are common. A human viewer of frames printed on such devices typically views a piece of paper at a distance of about 20 inches from the eye, in which case 600 pixels per inch corresponds to about 210 pixels/degree, and 1200 pixels per inch corresponds to about 420 pixels/degree. Perceptual studies have been conducted in cycles/degree, where a cycle is a regular pattern of black-white transitions. The highest frequency cycle which can be printed on a 600 pixels/inch device is then 210/2=105 cycles/degree; such a cycle is created by alternating white and black pixels in the output. A study (F. I. Van Nes and M. A. Bouman, "Spatial Modulation Transfer in the Human Eye", Journal of the Optical Society of America, 57(3):401–6, March 1967, incorporated herein by reference) showed that 5 cycles/degree is the frequency at which the human visual system is most sensitive. In addition, the human viewer has roughly 50 times less contrast sensitivity to features at 50 cycles/degree and roughly 300 times less contrast sensitivity to features at 100 cycles/degree than to features at 5 cycles/degree.

Therefore, for a 600 pixels/inch device, a human viewer has essentially no sensitivity to features smaller than 2×2 pixels. Similarly, for a 1200 pixel/inch device, a human viewer has essentially no sensitivity to features smaller than 4×4 pixels.

However, care must be used when drawing conclusions about sensitivity because human viewers can detect Moire patterns in halftoned areas or small differences in color or boldness of text or line art which occur at resolutions finer than 600 pixels/inch. For example, a grid of closely spaced parallel lines of equal thickness and separation, when printed on a device of a lower resolution, may be seen to be of different thickness or spacing when rendered onto a 600 pixels/inch or even higher resolution device.

As another example, the Mach band effect is a property of human vision which causes an edge to be perceived at a boundary between two slightly different grays. The effect is to perceive the darker gray as darker and the lighter gray as lighter next to the boundary. There is a threshold of gray level difference below which this perceptual effect does not occur, a small region of transition where the effect begins to occur, and a marked noticeable edge enhancement above the transitional region. Roughly, the Mach band effect seems to begin to occur at boundaries for which the change in gray level at the boundary is 0.5% to 1.0%. When an image has a gradual change in gray level, say, from full sunlight to deep shadow, an insufficiency in the number of gray levels for the halftoning process will result in Mach band effect lines where the gray level changes, and a human will see these as defects in the image reproduction. Depending upon the ratio between the darkest and lightest grays which an output device can produce, this means that the halftoning process on a device will need several hundred to several thousand grays to avoid such Mach band effect streak defects on most devices, or up to 50,000 grays on photographic transparencies.

When an image is halftoned into pixels, several different spatial frequencies or periodicities may interact to produce patterns which reduce the perceived quality of the reproduction. For example, if the image has six samples along the scan line for every seven picture elements in the same direction, a non-uniformity will repeat every seven picture elements. A different image sample will determine the color of each pixel for five consecutive pixels, and a single image sample will determine two consecutive pixels. The aggregation of this irregularity over the length or width of the frame can form visible streaks.

A regular (i.e., uniform) halftoned geometry introduces additional patterning at the periodicity of the regular halftoned dots. For example, if halftoned dots recur in a regular pattern every five pixels, long streaks may be formed with a five pixel separation. When an image has an edge that is at a small angle with respect to a column, row, diagonal, or other line of halftoned dots, then low frequency 'beating' patterns can occur between that feature in the image and the halftoned dots. Also, for multi-color printing with regular screens, screen angles must be carefully chosen to reduce the spatial frequency of interactions between the different halftoned screens of the different colors.

An advantage of an irregular halftoning technique such as Adobe Brilliant Screens™ is that the jumbled character of the halftone dots eliminates halftone geometry problems by preventing the aggregation of local irregularities into larger dimension streaks. However, patterning due to the interaction of the image and device (e.g., the seven-pixel periodicity of the earlier example) remains even with irregular halftoning.

In sum, it seems that resolutions higher than 300 pixels/inch for images or area fills (as opposed to text and strokes) are visually most significant for the creation of finer halftone dots where images or fills appear. Although resolutions higher than 300 pixels/inch are useful for more spatial detail, the spatial details may not be visually perceptible.

The invention can be used to produce halftone images on typesetting devices, xerographic and inkjet printers, CRT displays or any other digital display, printing, or similar device. The invention can be applied to any variation of threshold halftoning and to other methods of halftoning which have the same functional dependencies as threshold halftoning.

The invention can be practiced using a device which may include a general-purpose computer or special purpose hardware and a raster display, printer, image setter, or other visual output device. The device which does the front-end interpretation may be different from the device which does the back-end rendering. For example, the front-end interpretation could be performed on a computer and the back-end rendering could be performed on a printer. In this case, after front-end interpretation, the representation of the image is sent over a communication channel such as an Ethernet. The image representation may be compressed after front-end interpretation and decompressed before back-end rendering.

The invention requires an image as its input. The color space of the image may be converted into the color space of the output device according to known techniques. The color space could be, for example, RGB (Red Green Blue), CMYK (Cyan Magenta Yellow Black), Monochrome (Gray), or other color spaces. The color space conversion may occur during image pre-processing, or it may be interspliced among the halftoning steps. The halftoning process usually occurs in the color space of the output device with a separate calculation on each color coordinate.

In the examples that follow, the invention will be described for an output device which uses the monochrome color space, which contains a single color component, and which produces, within the gamut of the device, colors varying from white to black. Therefore, an image sample will be referred to as a 'gray level'. The invention may be applied to output devices which use other color spaces, including color spaces containing more than one color component.

In addition, in the examples that follow, the invention will be described for an input image containing samples that can specify 256 different gray levels. It will be assumed that the sample values are integers in the range 0 to 255, including both end values. A mathematical notation for this range is [0 . . . 255]. Each integer representing an image sample value is stored in a unit of computer memory sufficient to represent the range of values. For the range [0 . . . 255], eight bits are sufficient and the unit of memory is one byte. A larger amount of memory can be used but is not required. The invention may be applied to larger or smaller ranges. In addition, some image coordinate systems use signed numbers rather than positive numbers for image samples; e.g., the range [−128 . . . +127] could be used instead of [0 . . . 255].

It will also be assumed in the examples that follow that both image samples and output frame pixels are stored as rasters, that samples in successive scan lines of an image raster are vertically aligned with samples in preceding scan lines, and that pixels in successive scan lines of the output frame are vertically aligned with pixels in preceding scan lines. In discussing pixel locations in the raster, we will call the direction along the device scan lines the 'X direction' and the direction perpendicular to the device scan lines the 'Y direction'.

Under these assumptions, each pixel represents the colorant to be applied to a small rectangular portion of the picture. However, the invention may be applied and adapted to different representations of image samples and/or output frame pixels, such as raster variations or the Peano scan. A raster variation with many attractive properties is to stagger the scan lines in such a way that even-numbered scan lines are 0.5 pixels indented in the X direction. In this raster variation, each pixel represents the color for a small hexagonal portion of the picture.

Furthermore, in the examples that follow, the invention will be described for pixels that are bi-valued, with 0 representing white, and 1 representing black. White and black may be inverted, or the invention may be applied to multi-valued pixels. As discussed previously, halftoning of a multi-valued pixel would usually occur between two adjacent values (though this is not the only possibility).

Figures 3A, 3B:
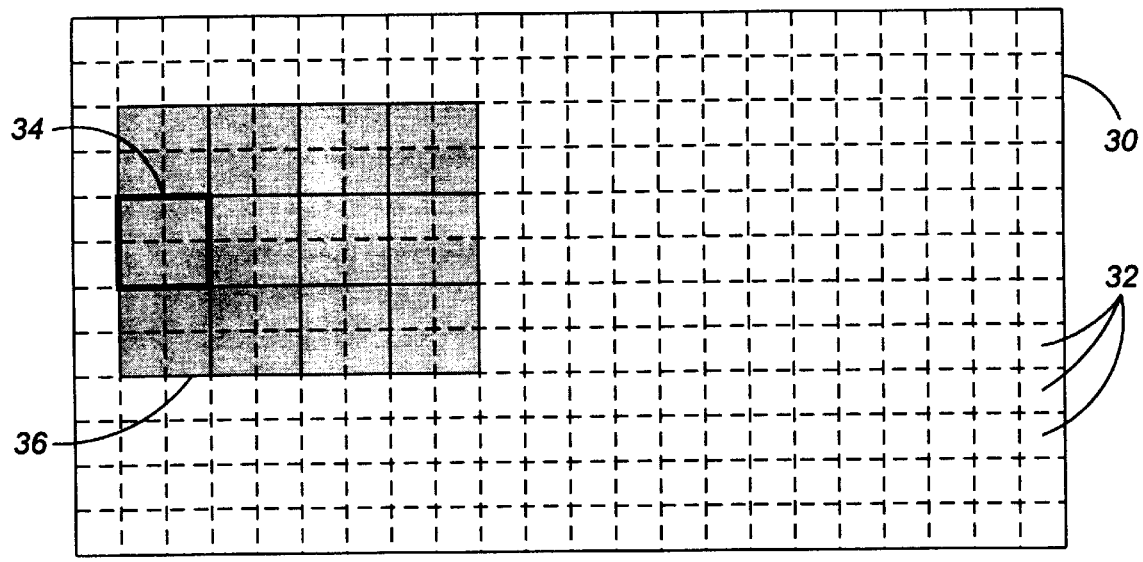
FIG. 3A illustrates an output frame having a tile.
FIG. 3B is an illustration of a table used by the halftoning method of the present invention.

As illustrated in FIG. 3A, in the method of the present invention, an output frame 30 is composed of pixels 32. The portion of output frame 30 underlying the image 36 is divided into multi-pixel tiles 34. Each tile 34 may be an M×N pixel rectangle, where M and N are integers. Preferably M and N are selected to produce about 100 tiles/degree or about 300 tiles/inch on an output device. It is advantageous that M and N each evenly divide the word size of the computer on which an implementation of the method is executed. Specifically, M×N=2×2 and M×N=4×4 are advantageous, but other values may also be used. In addition, the tiles could be other shapes or combinations of shapes, such as triangles, parallelograms, or hexagons. However, the tile must be larger than 1×1 pixels and have a shape or combination of shapes capable of covering the output frame.

Figure 2:
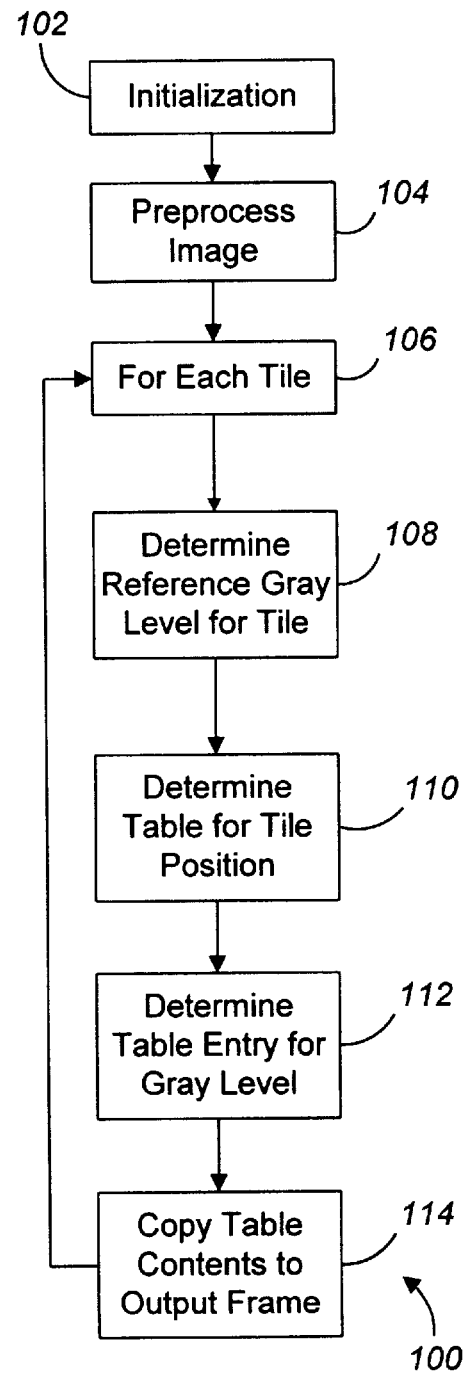
FIG. 2 is a flowchart of a method of halftoning according to the present invention.

Referring to FIGS. 2 and 3B, a halftoning method 100 in accordance with the present invention may be implemented as a computer program. It begins in an initialization step by building at least one table 40 (step 102). The table 40 includes an entry 42 for each referenced gray level 44. Each entry 42 includes a halftone pattern 46. The halftone pattern 46 is constructed with the assumption that each pixel in the M×N pixel tile 34 has the same reference gray level. Thus, the table maps a reference gray level to an M×N pixel halftone pattern.

After initialization is complete, the tables may be reused to produce halftone output at a significantly higher speed. In the embodiments described below, the table or tables are calculated from a set of thresholds specified in a threshold array. The set of thresholds can be specified by a threshold array, an array of threshold arrays, a spot function, or in other ways. Alternately, the halftoning tables could be specified directly, without calculating them from a set of thresholds. However, it is advantageous to calculate the table or tables from a set of thresholds so that a graphic object in the output frame can be halftoned using conventional threshold arrays without creating visible flaws at the boundaries between the graphic object and the image. In addition, known threshold arrays which give superior visual results can be applied in conjunction with the invention.

The invention works for threshold arrays of any dimension and range of threshold values.

An element of a threshold array will be called a 'threshold'. The threshold is compared to a reference gray level from an image. In the examples below, it is assumed that the pixel is colored black if the reference gray level is less than the threshold, otherwise the pixel is colored white. The required number of threshold values is one less than the possible number of sample values. Thus, if the range of the image samples is [0 . . . 255], threshold values in the range [0 . . . 254] are needed to provide a distinct gray level for every possible image sample value. Therefore, if eight bits are used for each image sample, it is convenient to use eight bits for each threshold. A larger amount of memory can be used per threshold, but is not required. A smaller amount of memory can be used, but this will limit the number of gray levels which the halftoning process can achieve to a smaller number than is specifiable with an image sample.

Following initialization, the halftoning program performs preprocessing of the image (step 104). The preprocessing of the image will be discussed below with respect to FIGS. 4A–4C.

Once the image has been preprocessed, the halftoning program iterates a series of halftoning steps for each tile 34 in the output frame 30 underlying the image 36 (step 106). In each iteration, a single reference gray level is calculated for the tile 34 (step 108). The manner in which the reference gray level is determined depends upon the preprocessing of the image, and will be discussed below with respect to FIGS. 4A–4C. Then the halftoning program determines the table 40 that corresponds to the position of the tile 34 (step 110). The reference gray level is used to index the table 40 to select a table entry (step 112). Finally, the pattern 46 from the selected table entry is copied into the tile pixels of the output frame (step 114). Thus, in method 100, all the pixels 32 in the tile 32 are produced in a single operation. In contrast, prior halftoning required a distinct threshold comparison or table lookup for each pixel in the tile. Thus, for example, if the tile is a rectangle with M×N=2×2, the halftoning speed is improved by a factor of about four. If the tile is a rectangle with M×N=4×4, speed is improved by a factor of about sixteen. In essence, all pixels in the output frame underlying the image are used for their effect on gray level, but the control of spatial resolution is quantized in blocks M pixels wide and N pixels high.

If a human viewer could see spatial details finer than M×N pixels or perceive additional Moire patterns resulting from determining a single reference gray level for each M×N pixel tile, the quality of the output might be degraded. For laser printer output, human viewers generally cannot perceive spatial details finer than 2×2 pixels at 600 pixels/inch or finer than 4×4 pixels at 1200 pixels/inch. For most natural scenes at 600 pixels/inch, spatial details finer than 4×4 pixels are also imperceptible. For other kinds of image content, such as text or line art, spatial details finer than 4×4 pixels might be needed to avoid degraded quality.

If the threshold array produces a regular halftone dot geometry, then it is advantageous to have the regular dots form at multiples of M pixels horizontally and N pixels vertically and be aligned with the M×N pixel tiles, as this seems to provide the best visual results. The use of an irregular halftone dot geometry, such as that for Adobe Brilliant Screens, also seems to provide superior quality.

As discussed above, the image is preprocessed in step 104 and the reference gray level is determined for the tile in step 108. Three alternate implementations of the method are described with reference to FIGS. 4A–4C.

Figure 4A:
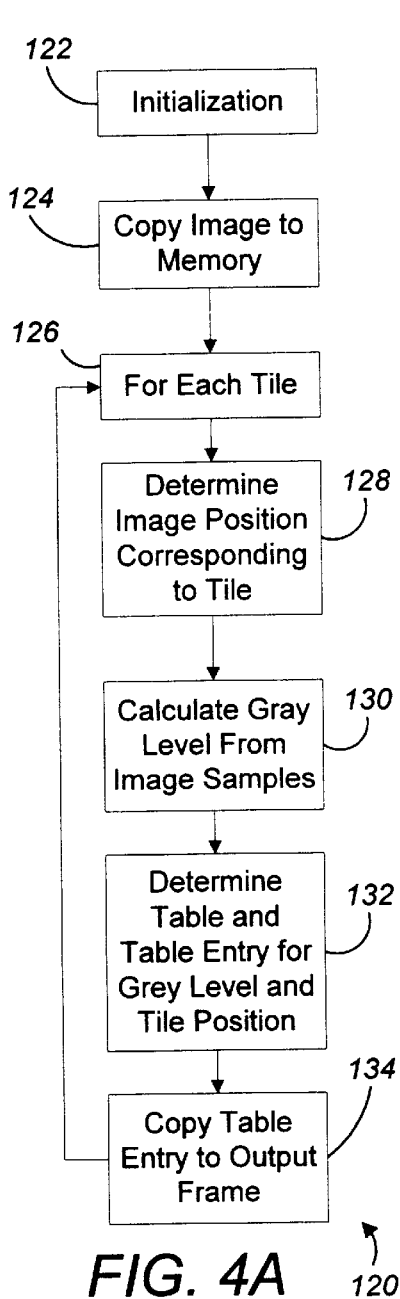
FIGS. 4A–4C are flowcharts of three embodiments of a halftoning method.

Referring to FIG. 4A, a halftoning method 120 may be used if the memory required to store the image is smaller than the memory required to store the output frame underlying the image. In method 120, after initialization (step 122), the halftoning program performs front-end processing by simply copying the image into the memory of the output device (step 126). During each halftoning iteration (step 126), the halftoning program computes the position within the image corresponding to the position of the tile being halftoned in the output frame (step 128). Once the position within the image has been determined, the reference gray level for the tile is calculated from the samples overlying the tile (step 130). The calculation may be performed according to known practices, such as point sampling, averaging, linear interpolation, and bi-cubic interpolation. The program determines the proper table for the position of the tile and selects a table entry corresponding to the reference gray level (step 132) and copies the selected table entry into the output frame (step 134).

If the relationship between the image and output frame raster positions is linear (e.g., scaling, rotation, and translation are linear), then it is possible to compute the change in image raster position that is associated with a change in the output frame raster position. To illustrate this linear case, F, G, H, and J will be used to denote 4 signed numbers, each of which has both an integer and a fractional part. The numbers F, G, H and J are selected so that each step of 1 pixel in the X coordinate of the output frame steps F samples in the X coordinate of the image raster and G scan lines in the Y coordinate of the image raster and each step of 1 scan line in the Y coordinate of the output frame steps H samples in the X coordinate of the image raster and J scan lines in the Y coordinate of the image raster. To move to the next position, the corresponding steps are M×F samples, M×G scan lines, N×H samples, and N×J scan lines, respectively.

Figure 4B:
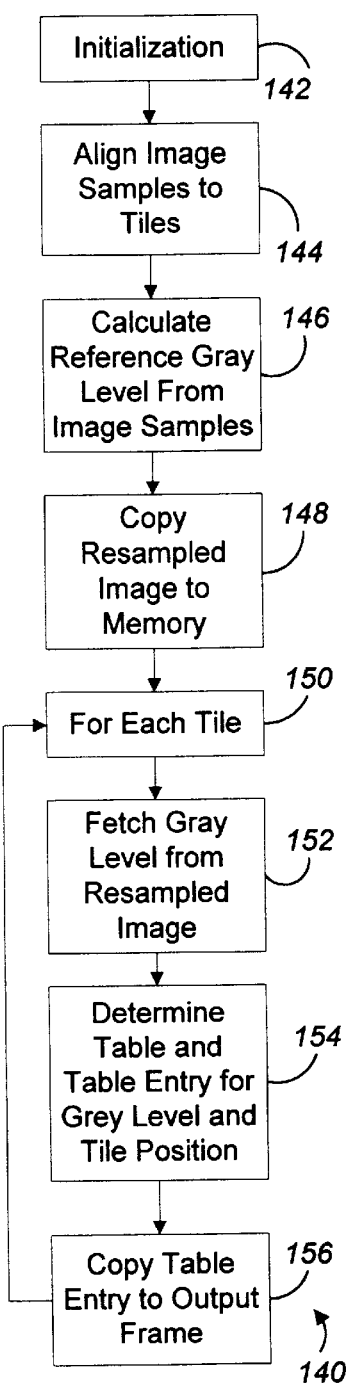

Referring to FIG. 4B, an alternative halftoning method 140 may be used if the memory required to store the image is larger than the memory required to store the output frame underlying the output frame. In method 140, after initialization (step 142), the image raster is scaled, rotated, translated, and/or clipped to align the image samples with the tiles of the output frame (step 144). For each M×N pixel tile of the output frame, a reference gray level is determined that is a function of the image samples which overlie the M×N pixel tile (step 146). The resulting resampled image is copied to the memory of the output device (step 148).

The reference gray level for the M×N pixel tile may be determined in step 146 by known methods, such as point sampling, averaging, linearly interpolation, and bi-cubic interpolation. In some cases, such as point sampling, these methods will depend only on image samples which are directly over the M×N pixel region. In other cases, such as bi-cubic interpolation, the calculation may also depend on other nearby image samples.

In each halftoning iteration (step 150) the halftoning program simply fetches the next value from the resampled image (step 152). This value will be the next reference gray level. The program determines the proper table for the position of the tile in the output frame and uses the reference gray level to select a table entry (step 154). Finally, the program copies the selected table entry into the output frame (step 156). In each iteration the program increments the image position. Method 140 will often be faster than method 120 in back-end rendering. However, method 140 may be slower overall due to extra preprocessing of steps 144–146. Methods 120 and 140 require less memory than the output frame's 1 bit/pixel only if the image is small enough. For method 140, the memory required to hold the resampled image is eight bits for every M×N pixels, irrespective of image size. Thus, if M×N is greater than eight, then the resampled image is smaller than the output frame.

The methods illustrated in FIGS. 4A–4B illustrate and do not exhaust the possibilities. It would, for example, be possible to rotate the image by 90 degrees without resampling, or to resample it to a different resolution.

Figure 4C:
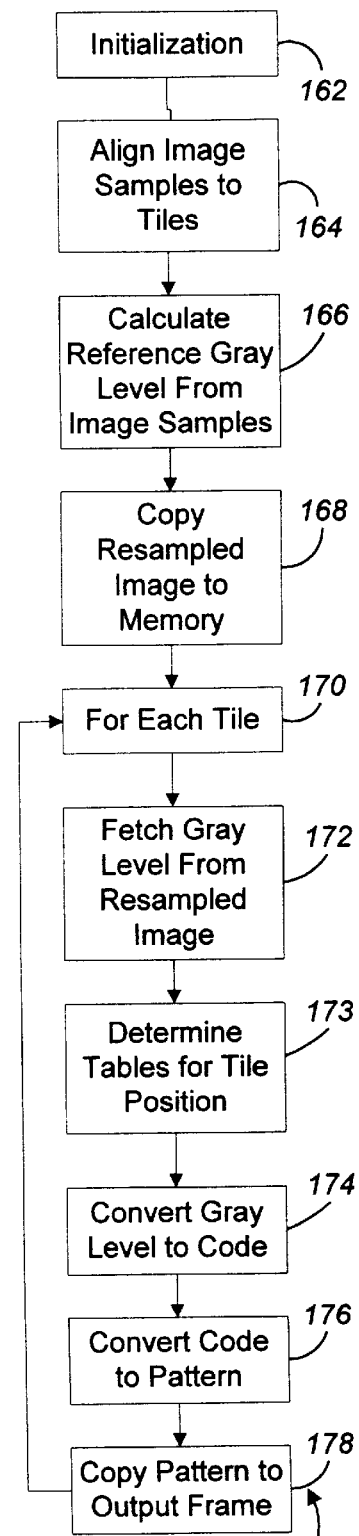

Referring to FIG. 4C, an alternative method 160 may be used to reduce the memory required to perform halftoning. In this alternative, the image is resampled during front-end interpretation, and the 8-bit reference gray level is converted into a smaller code.

The thresholding process creates monotonic behavior of each pixel; i.e, a particular pixel is always white for image samples less than its threshold, and always black for image samples greater than or equal to its threshold. Therefore, all possible patterns are achieved by turning the pixels on one-by-one. Consequently, there are only (M×N)+1 different patterns that can occur in a M×N pixel region. For a 2×2 region, there are 5 patterns, whereas for a 4×4 region there are 17 patterns. Thus, it is possible to replace the reference gray level [0 . . . 256] with a code that assumes only (M×N)+1 values. Such a code needs $\log_2$ (M×N+1) bits of storage.

In the initialization step of method 160, two sets of tables are generated (step 162). One table converts the reference gray level into a code that uses only $\log_2$ (M×N+1) bits. The second table converts the code into a pixel pattern.

After initialization (step 162), the image is resampled (step 164) and a reference gray level is calculated for each region (step 166) as described in steps 144–146 of method 140. Finally, the resampled image is copied to the memory of the output device (step 168).

In each iteration (step 170), the halftoning program fetches the next reference level from the resampled image (step 172). The reference gray level is converted into a code by the first table (step 174), and the code is converted into a pattern by the second table (step 176). Finally, the pattern is copied into the output frame (step 178).

In this alternative, the back-end rendering can be carried out in steps 176–178 with a table lookup in which each table has only M×N+1 entries. The memory reduction is shown in the following table, which gives the number of bits per M×N pixel region for the fully-halftoned output frame, method 140, and method 160:

| M × N | Output Frame | Method 140 | Method 160 |
|---|---|---|---|
| 2 × 2 | 4 | 8 | $\log_2$ (5) = 2.32 |
| 4 × 4 | 16 | 8 | $\log_2$ (17) = 4.09 |

Method 160 generally requires less memory to store the resampled image than method 140. However, if the original image is at much lower resolution than the output frame, then method 120 requires less memory than either method 140 or 160. Recoding from eight bits per gray level to a smaller code makes it practical to use larger tables and produce more pixels per iteration to achieve faster back-end rendering. The speed improvement may be sufficient to permit race-rendering. In addition, by eliminating the need for a frame buffer, the reduction in required memory could permit a reduction in the total memory of the output device memory.

In the methods of FIGS. 4A and 4B, it is possible to aggregate tables, but resulting aggregated tables may be prohibitively larger. For example, for two side-by-side 8-bit image samples, a table of length 256×256=65,536 entries would be needed. In contrast, in the method of FIG. 4C, the aggregated table would have 25 entries (for M×N=2×2) or 289 entries (for M×N=4×4).

Method 160 may be used if methods 120 or 140 are not fast enough to race-render the image or if memory reduction is desired. However, the extra table reference in method 160 may make the total time for front-end interpretation plus back-end rendering longer than methods 120 or 140.

Method 160 can be used to advantage when the number of different patterns that occur as a function of the gray level is smaller than the eight bit reference gray level; it need not be as small as (M×N)+1.

The top, bottom, left, and right edges where the image is merged into the output frame may be handled according to the known practices.

Similarly, clipping and transparency, where the image is either clipped by or blended with other content of the output frame, may be handled according to known practices. The steps which handle clipping and/or transparency may be interspersed with the halftoning steps, or they may precede or follow the halftoning steps.

Glyphs, fills, strokes, and other graphic objects may be halftoned with the same halftoned threshold array or other technique as images. Halftoning of graphic objects differs from halftoning images because filling a mathematical outline with a gray value is not the same as sampling an image at a point. However, the invention may be used for halftoning glyphs, fills, strokes, or other graphic objects. The tables created for the invention can also be used by a program which determines reference gray levels from a mathematical outline.

When halftoning a graphic object, a mathematical outline colored by a gray level during front-end interpretation may be replaced by a set of image sample values. A similar back-end rendering may then be performed. Alternatively, the reference gray level may be determined from the outline being filled rather than from an image sample value.

Six embodiments of the invention (labeled as Variations A–F) are described below. Variation A is a general embodiment of the invention. Variations B and C are refinements of Variation A which use more parallelism. Variation B uses an M×N=2×2 pixel tile. Variation C uses an M×N=4×4 pixel tile. Variation D is a general embodiment of the invention which uses the method of FIG. 4C. Variations E and F are refinements of Variation D which use an M×N=2×2 pixel tile and an 4×4 pixel tile, respectively.

Variation A (M×N)

Figures 5A, 5B, 5C:
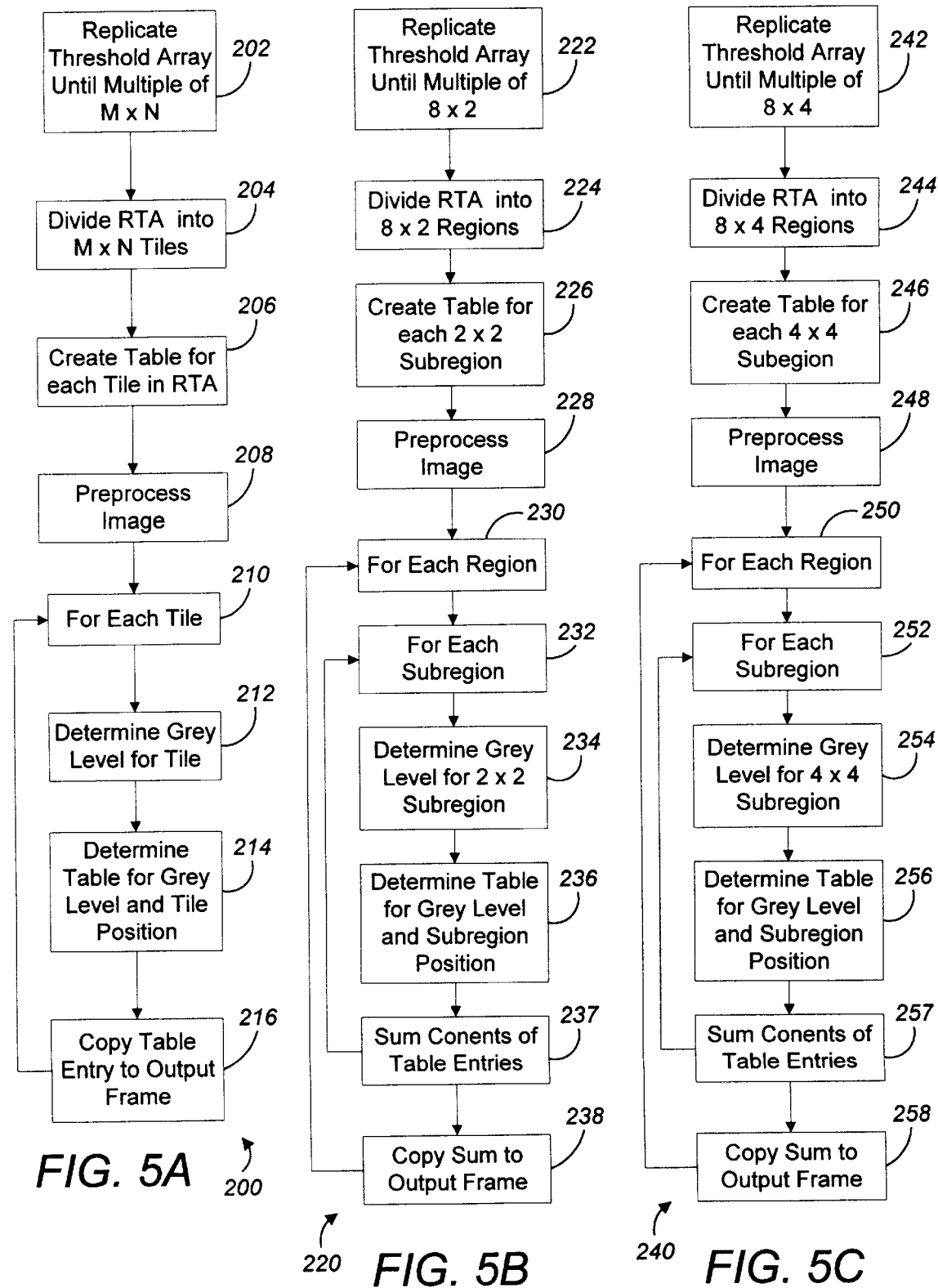
FIGS. 5A–5F are flowcharts of six embodiments of a halftoning method.
Figure 6A:
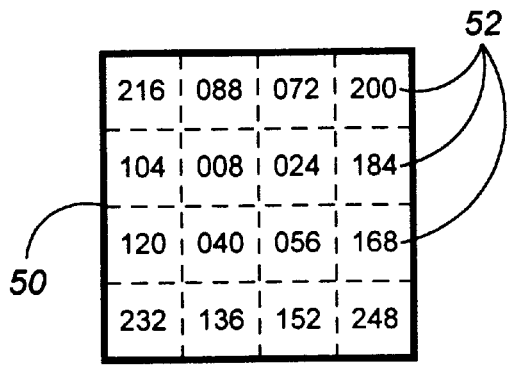
FIG. 6A is an illustration of a threshold array.
Figure 6B:
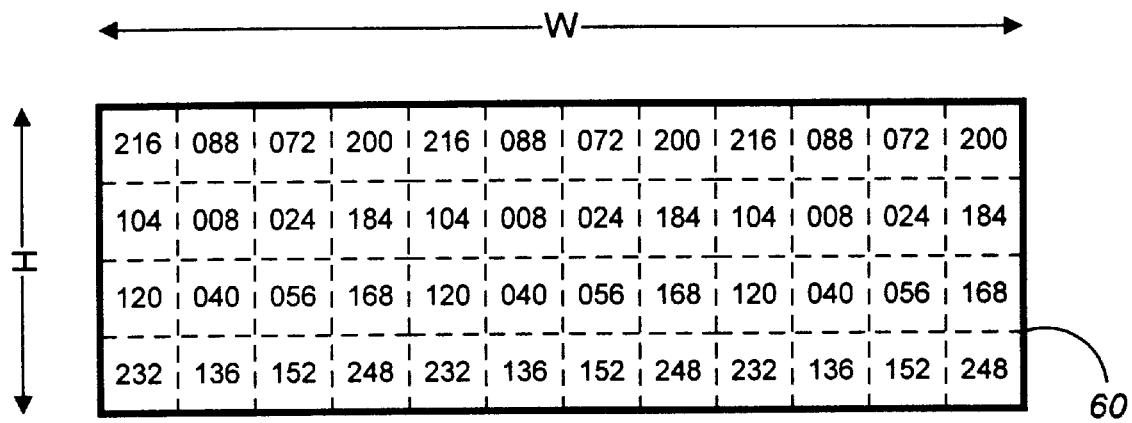
FIG. 6B is an illustration of an replicated threshold array created from the threshold array of FIG. 6A for a 3×4 pixel tile.
Figure 6C:
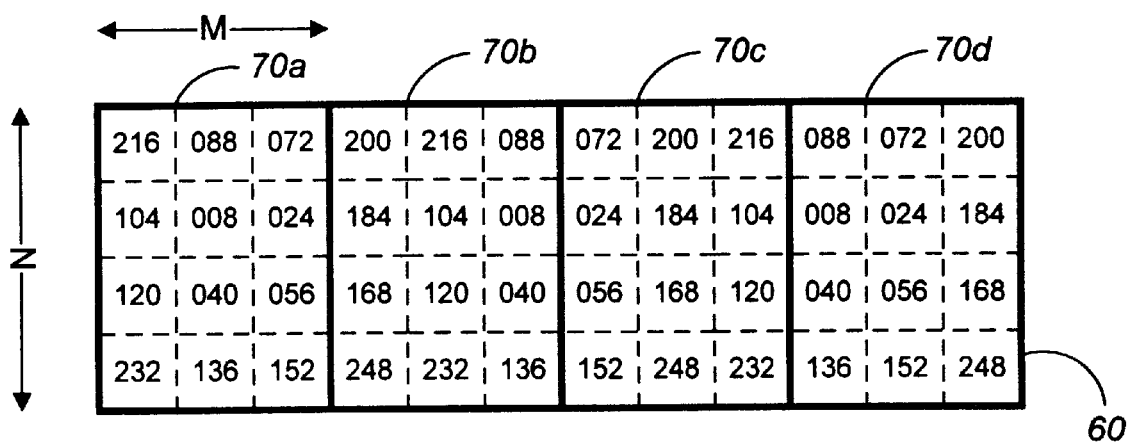
FIG. 6C is an illustration of the RTA of FIG. 6B divided into 3×4 pixel tiles.

Referring to FIGS. 5A and 6A–6C, in the halftoning method 200 of variation A, the halftoning program begins with a one-time initialization. In the initialization, the halftoning program replicates a threshold array 50 horizontally until it is a multiple of M pixels wide, and vertically until it is a multiple of N pixels high (step 202). The result of this replication is called a Replicated Threshold Array 60 (or RTA). In FIGS. 6A–6C, the threshold array is shown as a 4×4 pixel square and the RTA is shown for M=3 and N=4. However, these values are merely illustrative.

The RTA is divided into regions 70*a*–70*d*. Each region is a M×N pixel rectangle (step 204). Referring to FIGS. 5A and 7A, one table 270*a*–270*d* is created for each region 70*a*–70*d* in the RTA 60 (step 206). Each table includes an entry 272 for each possible reference gray level 274. Each entry 272 has a pattern 276 that is calculated with the assumption that each pixel in the region has the same reference gray level. Thus, each table entry 272 contains the M×N pixel halftone pattern for an M×N pixel region having the indexed gray level.

If the RTA 60 is W pixels wide and H pixels high, then the total number of table entries 272 created in initialization is:

(W/M)×(H/N) tables×256 entries/table=

(W×H×256)/(M×N) entries

Each pattern 276 holds M×N bits.

The tables may be created for a pre-specified set of thresholds during the manufacture of a device and stored in ROM, or they may be created during the operation of the device and stored in RAM.

To halftone the image, the image is preprocessed (step 208). The image may be preprocessed by simply buffering the image samples at the image resolution. Alternatively, the halftoning program may sample the image at 1/M times the device resolution horizontally and 1/N times the device resolution vertically. Then the resampled image may be aligned with the output pixels so that the samples align with the pixels in the M×N tiles.

The halftoning program iterates over each M×N pixel tile underneath the image (step 210). On each iteration, the halftoning program determines the image reference gray level for the tile (step 212), determines the table 270 that corresponds to the position of the M×N tile, uses the reference gray level to index the table 270 (step 214), and copies the M×N bit pattern 276 to the tile in the output frame (step 216).

The iteration of step 210 may be arranged as an outer loop over N scan line units in the output frame which are underneath the image, a middle loop which stores N registers of halftone patterns into the output frame, and an inner loop which constructs the values in the N registers M bits at-a-time by picking apart M×N bit table entries. This may be efficient to implement if the computer word size is a multiple of M bits.

If the image is resampled during step 208, there is only one image sample over the tile. The value of this sample may be used as the reference gray level for step 217. In this case, the selection or blending to determine the reference gray level effectively occurred during step 208.

For race-halftoning, the image is completely processed through step 208 and saved in memory. Then steps 210–216 are performed during the race, while the results of step 208 are fetched from memory.

To increase halftoning speed, the results of several M×N pixel regions may be aggregated into a register before picking the register apart and putting the results into the output frame. Variations B and C illustrate faster embodiments using this idea.

Variation B (M×N=2×2)

Variation B is an embodiment of the invention for an M×N=2×2 pixel tile. Variation B uses a 2-byte unit per iteration for the tables.

Referring to FIG. 5B, in the halftoning method 220 of Variation B, the halftoning program begins initialization by replicating the threshold array horizontally until it is a multiple of eight pixels wide and vertically until it is a multiple of two pixels high to generate the RTA (step 222).

Then the RTA is divided into four regions, each region being 8 pixels wide and 2 pixels high (step 224). Four tables are created for each 8×2 pixel region (step 226). Specifically, one table is created for each 2×2 pixel subregion in the 8×2 pixel region. The tables are calculated with the assumption that each pixel in the 2×2 pixel tile of the output frame underlying a 2×2 pixel subregion of the RTA has the same reference gray level. Each table is indexed on the 8-bit reference gray level, and each table entry contains a four pixel halftone pattern for the 2×2 pixel block colored by the index gray value. However, the four tables differ in the location of the four bits representing the pattern as follows:

Table B0: AA000000 aa000000

Table B1: 00BB0000 00bb0000

Table B2: 0000CC00 0000cc00

Table B3: 000000DD 000000dd

Two bytes hold the 4-pixel halftone pattern for each table entry, with the two result pixels for the first scan line of the 2×2 pixel subregion in one byte and the two result pixels for the second scan line of the 2×2 pixel subregion in the other byte. The tables for each 2×2 pixel subregion have the bits representing the result pixels for each scan line aligned so that, if the tables are summed, they produce eight pixels in one byte for the first scan line and 8 pixels in another byte for the second scan line.

If the size of the RTA is W pixels wide and H pixels high, then the total memory for all of the tables is (W/2)×(H/2)× 256 entries×2 bytes/entry=W×H×128 bytes.

The halftoning program preprocesses the image (step 228) substantially as described with reference to step 208.

To halftone the image, an outer loop iterates for each 8×2 region (step 230). An inner loop iterates for each of the four side-by-side 2×2 pixel subregions (step 232). On each iteration, the halftoning program determines the reference gray level for the 2×2 subregion (step 234). The reference gray level is used to index the appropriate table that was created during step 226 (step 236). The table entry from the four subregions are summed in a sum register (step 237). Because of the alignment of bits in the table entries, the sum will form eight pixels for the first scan line in one byte and eight pixels for the second scan line in the second byte. Thus, the 16-bit result will appear as follows:

Sum: AABBCCDD aabbccdd

Finally, when a full byte has been loaded into the sum register for both scan lines, the bytes from the register are copied into the two scan lines of the output frame (step 238).

The iteration of steps 230–238 may be arranged as an outer loop over the two scan lines in the output frame underneath the image, a middle loop which stores two registers of halftone result into the two scan lines, and an inner loop which constructs the values in the two registers eight bits at-a-time by picking apart 16-bit sum. This may be easier to arrange if the computer word size is a multiple of eight bits.

Because Variation B determines four pixels per table lookup using about the same amount of calculation as conventional halftoning uses to determine one pixel, it runs about four times faster.

The details of how the halftone result is assembled can significantly affect overall speed. As with Variation A, the halftone speed may be increased by accumulating full-word halftone results in two registers before storing the halftone result into the output frame. Also, steps 230–238 are illustrated for eight bits per scan line using four adds of table entries each sixteen bits per table entry. However, on a 32-bit word size computer, it would be possible to accumulate sixteen bits per scan line by using 32-bit table entries and doing eight adds, or thirty-two bits could be accumulated per scan line on a 64-bit word size computer. The details of these steps will vary according to the computer word size, the number of registers, the speed of the memory bus and other device characteristics.

Variation C (M×N=4×4)

Variation C is an embodiment of the invention for an M×N=4×4 pixel tile. Variation C uses a 4-byte unit per iteration.

Referring to FIG. 5C, the halftoning method 240 of Variation C begins initialization by replicating the threshold array horizontally until it is a multiple of eight pixels wide and vertically until it is a multiple of four pixels high to generate the RTA (step 242). The RTA is divided into 8×4 pixel regions (step 244). Two tables are created for each 8×4 pixel region (step 246). Specifically, one table is created for each 4×4 pixel subregion in the 8×4 pixel region. The tables are created with the assumption that the pixels underlying the 4×4 pixel subregion of the RTA have the same reference gray level. Each table is indexed on the 8-bit reference gray level. Each table entry contains a 16-pixel halftone pattern for that 4×4 pixel subregion. The two tables differ in the location of the sixteen result pixels as follows:

Table C0: AAAA0000 BBBB0000 CCCC0000 DDDD0000

Table C1: 0000aaaa 0000bbbb 0000cccc 0000dddd

Four bytes hold the 16-pixel halftone pattern for each table entry, with the four result pixels for each scan line of the 4×4 pixel subregion in the corresponding table byte. The table for each 4×4 subregion has the bits representing the pattern aligned so that, if the tables are summed, they produce eight pixels in one byte for each of the four scan lines.

If the size of the RTA is W pixels wide×H pixels high, then the total memory for all of the tables is (W/4)×(H/4)×256 entries×4 bytes/entry=W×H×64 bytes.

The halftoning program preprocesses the image (step 248) substantially as described in step 208.

To halftone an image, an outer loop iterates for each 8×4 pixel region (step 250). An inner loop iterates for each of the two side-by-side 4×4 pixel subregions (step 252). On each iteration the halftoning program determines the reference gray level for the 4×4 pixel subregion (step 254). The reference gray level is used to index the appropriate threshold array table that was created during step 246 (step 256). The table entries for the two sub-regions are summed in a sum register (step 257). Because of the alignment of bits in the table entries, the sum will form eight pixels in one byte for each of the four scan lines. Thus, the 32-bit result will appear as follows:

Sum: AAAAaaaa BBBBbbbb CCCCcccc DDDDdddd

Finally, when a full byte has been loaded into the sum register for all four scan lines, the bytes from the register are copied into the four scan lines of the output frame (step 258).

The iteration of steps 250–258 may be arranged as an outer loop over four scan lines in the output frame which are underneath the image, a middle loop which stores the four registers of halftone result into the output frame, and an inner loop which constructs the values in the four registers eight bits at-a-time by picking apart the 32-bit sum. This may be easier to arrange if the computer word size is a multiple of eight bits.

Because Variation C determines sixteen pixels per table reference using about the same amount of calculation as conventional halftoning uses to determine one pixel, it runs about sixteen times faster.

The details of assembling the halftone result significantly affect overall speed. Like Variations A and B, the halftoning speed may be increased by accumulating full-word halftone results in the four registers before storing them into the output frame. Also, steps 250–258 are illustrated for eight bits per scan line using two adds of table entries. However, on a 64-bit word size computer, it would be possible to accumulate sixteen bits per scan line by using 64-bit table entries and doing four adds. The details of these steps will vary according to the computer word size, the number of registers, the speed of the memory bus and other device characteristics.

Variation D (M×N)

Figures 5D, 5E, 5F:
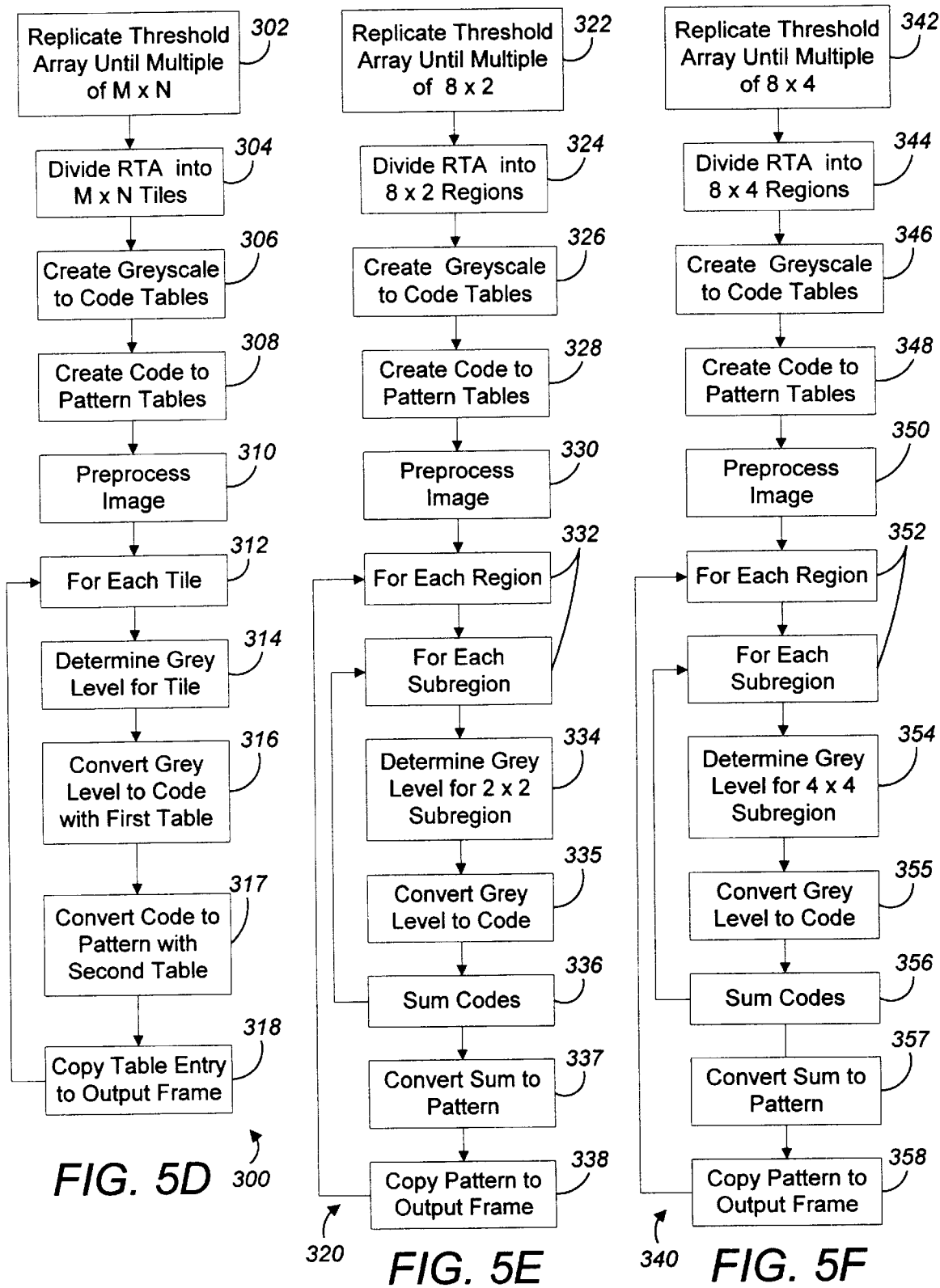

Referring to FIGS. 5D and 7B–7C, the halftoning method 300 of variation D begins initialization by replicating the threshold array to form the RTA (step 302). The RTA is divided into threshold regions (step 304). Each threshold region is a M×N pixel rectangle.

Then a first table 370 is created for each region in the RTA (step 306). Each table 370 is created with the assumption that the pixels in the M×N pixel region have the same reference gray level. In each table 370 an 8-bit reference gray level 374 is the index. Each entry 372 of table 370 contains a code 376. The code 376 may be an integer in the range [0 ... M×N]. In particular, the code may represent the number of black pixels in the tile. For an RTA that is W pixels wide and H pixels high, the total number of table entries 372 is W/M×H/N×256. Each entry 372 in the table 370 holds a number in the range [0 ... M×N], which requires $\log_2$ (M×N+1) bits. If M and N are small, this is less than the eight bits required to hold a reference gray level The halftoning program also creates a second table 380 for each region in the RTA (step 308). The second table 380 includes an entry 382 for each code 376 from the first table 370. The second table may be indexed on code 384. Each entry 382 from the second table 380 contains the M×N pixel halftone pattern 386 corresponding to the code 384.

For an RTA that is W pixels wide and H pixels high, the number of table entries for the second set of tables is:

(W/M)×(H/N) tables×((M×N)+1) entries/table=

(W×H×((M×N)+1))/(M×N) entries which is slightly larger than W×H entries. Each table entry has M×N bits.

In preprocessing, the image is resampled so that the M×N pixel tiles are aligned with the M×N threshold regions of the RTA (step 310).

To halftone the image, the halftoning program iterates for each M×N pixel tile that is underneath the image (step 312). For each tile, the halftoning program determines the reference gray level from the image (step 314), determines the proper tables corresponding to the position of the tile in the RTA, and converts the reference gray level into a code 376 by using the first table 370 (step 316). Then the program converts the code into the fully-halftoned pattern by using the second table 380 (step 317). This pattern is then copied into the M×N pixel tile of the output frame (step 318).

For race-halftoning, the result of steps 314–316 is saved in memory at the end of front-end interpretation. Then back-end rendering fetches each code from memory and performs step 317–318. For small values of M and N the amount of memory required for steps 317–318 is smaller than that required for step 208. The speed of steps 312–318 is about the same as that of steps 210–216.

Variation D has to pick apart the table entry fetched in step 317 in order to copy its pixels into the output frame.

Variation E (M×N=2×2):

Referring to FIG. 5E, the halftoning method 320 of Variation E begins initialization by replicating the threshold array horizontally until it is a multiple of eight pixels wide, and vertically until it is a multiple of two pixels high to generate the RTA (step 322). Then the RTA is divided into 8×2 pixel regions (step 324). The program creates four tables for each 8×2 pixel region. Specifically, the program creates one table for each 2×2 threshold sub-region in the 8×2 region with the assumption that each pixel underlying the 2×2 subregion of the RTA is colored by the same reference gray level (step 326). In the first set of tables, an 8-bit reference gray level is the table index, and the table entry contains a scaled number of black pixels in the 2×2 fully-halftoned pattern. The base number of black pixels in each subregion is in the range [0 . . . 4]. For the table entry, the base number of black pixels for the four sub-regions, denoted by U0, U1, U2, and U3, respectively, are scaled as follows:

Table E0: U0
Table E1: U1×5
Table E2: U2×25
Table E3: U3×125

Then, for each 8×2 region of the RTA, the halftoning program creates a second table which is indexed by a number in the range [0 . . . 624] that is the result of summing one entry from each of Tables E0, E1, E2, and E3 (step 328). Each entry in the second table contains the fully-halftoned 16-bit pattern for the 8×2 region.

When the halftoning program receives an image, the image is resampled to align the tiles of the output frame with the RTA (step 330).

To halftone the image, the program iterates over each 8×2 pixel region of the output frame that is underneath the resampled image (step 332). On each iteration, the halftoning program determines the reference gray level for each 2×2 subregion (steps 333–334). The reference gray levels are used to lookup the entries in the corresponding tables E0, E1, E2, or E3 (step 335). The four table entries are summed to obtain a code in the range [0 . . . 624] (step 336).

The code is converted into the fully-halftoned pattern for the 8×2 pixel region using the second table (step 337). Then this pattern is copied to the 8×2 pixel tile of the output frame (step 338).

For race-halftoning, the result of steps 334–336 is saved in memory at the end of front-end interpretation. The memory required for steps 334–336 is a little over nine bits, which is smaller than the sixteen bits required to hold the 8×2 pixel region of the output frame. Then back-end rendering fetches each code from memory and performs steps 337–338. Back-end rendering is about four times faster than Variation B and about sixteen times faster than conventional techniques.

Variation F (M×N=4×4):

Referring to FIG. 5F, the halftoning method 340 of Variation F begins by replicating the threshold array horizontally until it is a multiple of eight pixels wide, and vertically until it is a multiple of four pixels high to generate the RTA (step 342).

Then the program divides the RTA into 8×4 pixel regions (step 334). A first table is created for each 4×4 pixel subregion in each 8×4 region (step 346). Each first table is indexed on the 8-bit gray level. Each entry contains a scaled number of black pixels. The base number of black pixels is calculated with the assumption that each pixel of the output frame underneath the 4×4 subregion has the same reference gray level. This base number of black pixels is in the range [0 . . . 16]. For the table entry, the base number of black pixels for the two sub-regions, denoted by S0 and S1, respectively, are scaled as follows:

Table F0: S0
Table F1: S1×17

Then, for each 8×4 pixel region of the RTA, the halftoning program creates a second table which is indexed by a number in the range [0 . . . 288] that is the result of summing one entry from each of Tables F0 and F1 (step 348). Each table entry from the second table contains the fully-halftoned 32-bit pattern for the 8×4 pixel region.

Thus, the 32-bit table entry contains one byte of the fully-halftoned pattern for each of four scan lines. Within each byte, there are four bits from the first 4×4 pixel subregion of the 8×4 pixel region and four bits from the second 4×4 pixel subregion.

When the halftoning program receives and image, the image is resampled to align each 8×4 tile of the output frame with an 8×4 pixel region of the RTA (step 350).

To halftone the image, the program iterates over each 8×4 pixel region of the output frame that is underneath the resampled image (step 352). On each iteration the halftoning program determines the reference gray levels for the two 4×4 sub-region (steps 354). The reference gray levels are used to obtain the corresponding code entries for the tables corresponding to the two subregions (step 355). The two table entries are summed to obtain a code in the range [0 . . . 288] (step 356).

The halftoning program converts the code into the fully-halftoned pattern for the 8×4 pixel region by using the second table (step 357). Then the pattern is copied to the 8×4 pixel tile of the output frame (step 358).

For race-halftoning, the result of steps 354–356 is saved in memory at the end of front-end interpretation. The memory required for step 354–356 is a little over eight bits, which is smaller than the thirty-two bits required to hold the 8×4 pixel tile of the output frame. The back-end rendering is about two times faster than Variation C. In addition, the back-end rendering computes thirty-two pixels per iteration compared to one pixel per iteration. Because the iterations require about twice as much computing, the overall speed improvement is about sixteen times.

The fact that the codes are slightly larger than eight bits is inconvenient on 32-bit word size computers. Convenient memory packing sizes are powers-of-two. It might be desirable to reduce the memory requirement for each table entry of Variation F to eight bits. One way is to restrict each 4×4 pixel sub-region to only sixteen values instead of the seventeen required by Variation F. For example, the halftoning program could require that each 4×4 sub-region have one duplicated threshold. Alternatively, the program could require one of the two 4×4 sub-regions to have two duplicated thresholds. If either of these requirement is imposed, then the sum of entries from modified Tables F0 and F1 can be stored in eight bits.

Figure 8:
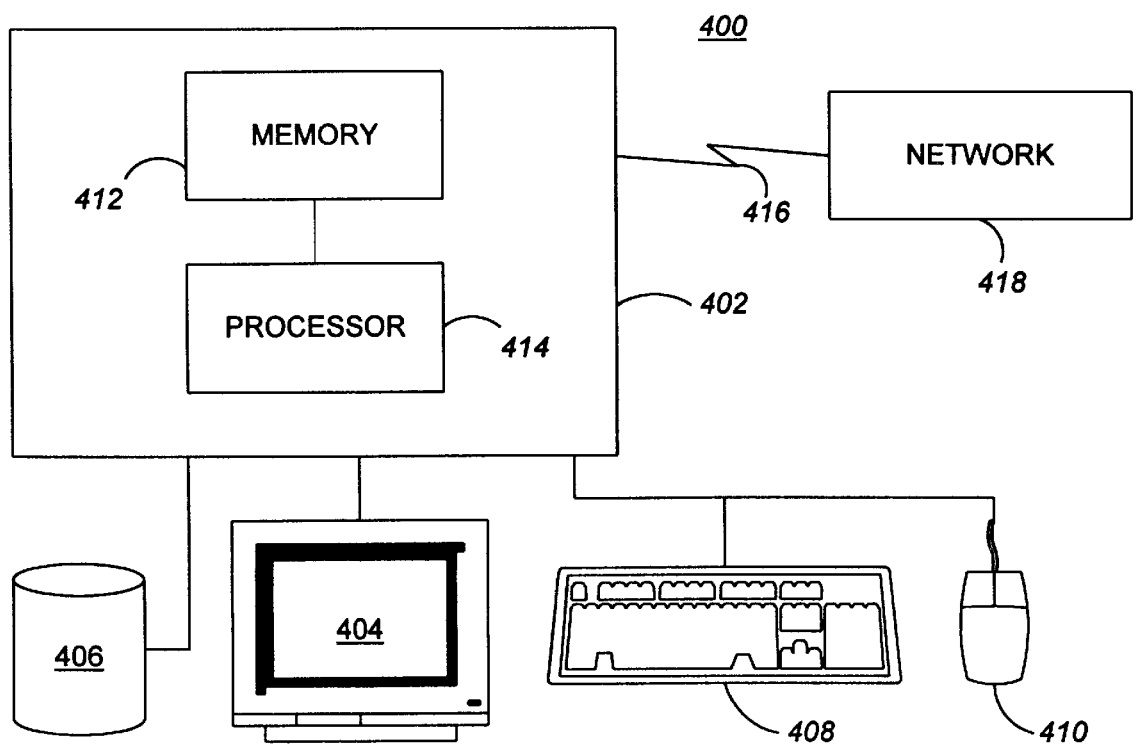
FIG. 8 is a schematic illustration of a computer system suitable for practicing the invention.

Referring to FIG. 8, the invention may be implemented on a programmed general purpose computer system 400. The computer system 400 includes a digital computer 402 (such as a personal computer or a workstation), a display 404, a mass storage device 406 (such as a floppy-disk drive, a hard-disk drive, a CD-ROM drive, or a magneto-optical disk drive), a keyboard 408, and a mouse 410 or other pointer device (such as an input tablet). The computer 402 is of conventional construction and includes a memory 412, a processor 414, and other customary components, such as a memory bus and a peripheral bus (not shown). The computer 402 also includes communications hardware and programs (not shown) by which the computer system 400 may be connected over a communications link 416 to other computers 418 to form a computer network. The computer system 400 includes a program to display, print or otherwise produce an image on an output device using the halftoning methods of the present invention. The program may be centralized on a single computer, or it may be distributed across the computer network.

What is claimed is:

1. A method of generating halftone output on an output device, comprising:

retrieving a plurality of tables which associate gray levels with halftone results for a region of an output frame including more than one pixel;

determining a reference gray level from a plurality of pixels of an image for a tile of an output frame including more than one pixel;

determining a position of the tile in the output frame;

selecting one of the tables from the plurality of tables based on the position of the tile;

using the selected table to determine a halftone result for the reference gray level;

storing the halftone result for the reference gray level to the tile of the output frame; and delivering the output frame to the output device.

2. The method of claim 1 further comprising: generating the table from a set of thresholds.

3. The method of claim 2 wherein the set of thresholds is a threshold array.

4. The method of claim 1 wherein the tile is rectangular.

5. The method of claim 4 wherein the tile is 2×2 pixels.

6. The method of claim 4 wherein the tile is 4×4 pixels.

7. The method of claim 1 further comprising:

compressing the reference gray level.

8. The method of claim 1 further comprising race-halftoning in the output device.

9. A method of generating halftone output on an output device, comprising:

retrieving at least one table which associates gray levels with halftone results for a region of an output frame including more than one pixel;

determining a reference gray level for a tile of an output frame including more than one pixel;

using the at least one table to determine a halftone result for the reference gray level;

storing the halftone result for the reference gray level to the tile of the output frame; and delivering the output frame to the output device;

wherein the at least one table includes a first table which associates gray levels with codes and a second table which associates codes with halftone results, and wherein using the at least one table includes converting the reference gray level to a reference code with the first table and converting the reference code to the halftone result for the reference gray level with the second table.

10. The method of claim 9 wherein converting the reference gray level to a code occurs during a front-end interpretation and wherein converting the reference code to the halftone result occurs during a back-end rendering.

11. The method of claim 9 wherein the code represents the number of black pixels in the region.

12. The method of claim 9 further comprising:

compressing the code.

13. A method of generating halftone output on an output device, comprising:

dividing an output frame into a plurality of tiles, each tile including more than one pixel;

retrieving a plurality of tables which associate gray levels with halftone results for a region of the output frame, the region including more than one pixel;

for each tile,
determining a reference gray level from a plurality of pixels in an image,
determining a position of the tile in the output frame,
selecting one of the tables from the plurality of tables based on the position of the tile,
using the selected table to determine a halftone result for the reference gray level, and
storing the halftone result for the reference gray level to the tile of the output frame; and delivering the output frame to the output device.

14. A method of generating halftone output on an output device, comprising:

receiving an image;

dividing an output frame into a plurality of tiles, each tile including more than one pixel;

retrieving a first plurality of tables which associate gray levels with codes;

retrieving a second plurality of tables which associate codes with halftone results for regions including more than one pixel;

for each tile,
selecting one table from the plurality of first tables and one table from the plurality of second tables based on the position of the tile in the output frame,
determining a reference gray level based on the portion of the image corresponding to the position of the tile in the output frame,
using the selected table from the first plurality of tables to convert the reference gray level to a code,
using the selected table from the second plurality of tables to convert the code to a halftone result, and
storing the halftone result to the tile of the output frame; and delivering the output frame to the output device.

15. A computer program for generating halftone output on an output device, the program tangibly stored on a computer-readable medium and comprising instructions for causing a computer to:

retrieve a plurality of tables which associate gray levels with halftone results for a region of an output frame including more than one pixel;

determine a reference gray level from a plurality of pixels of an image for a tile of an output frame including more than one pixel;

determine a position of the tile in the output frame;
select one of the tables from the plurality of tables based on the position of the tile;
use the selected table to determine a halftone result for the reference gray level;

store the halftone result for the reference gray level to the tile of the output frame; and
deliver the output frame to the output device.

* * * * *